(No Model.)
S. C. C. CURRIE.
METHOD OF FORMING PLATES FOR SECONDARY BATTERIES.
No. 411,786. Patented Oct. 1, 1889.
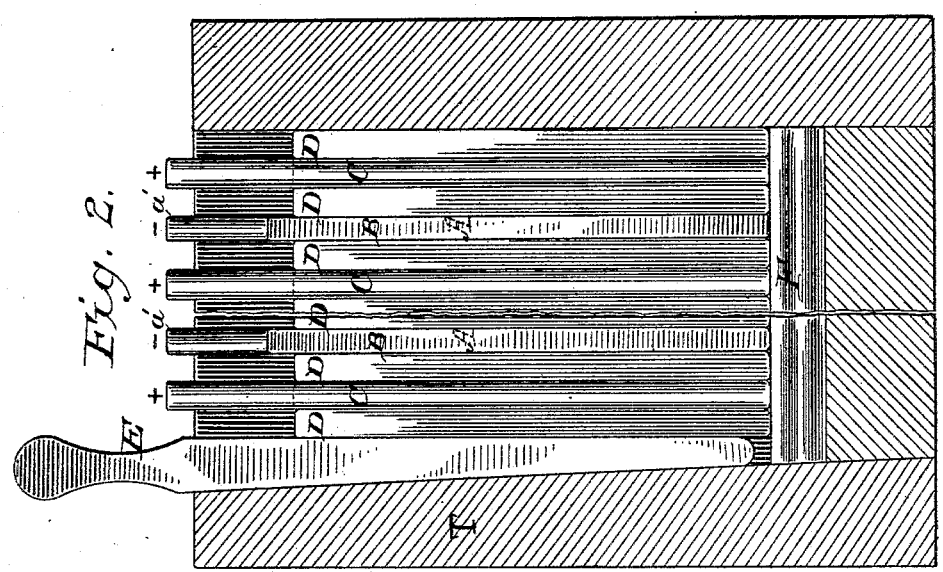
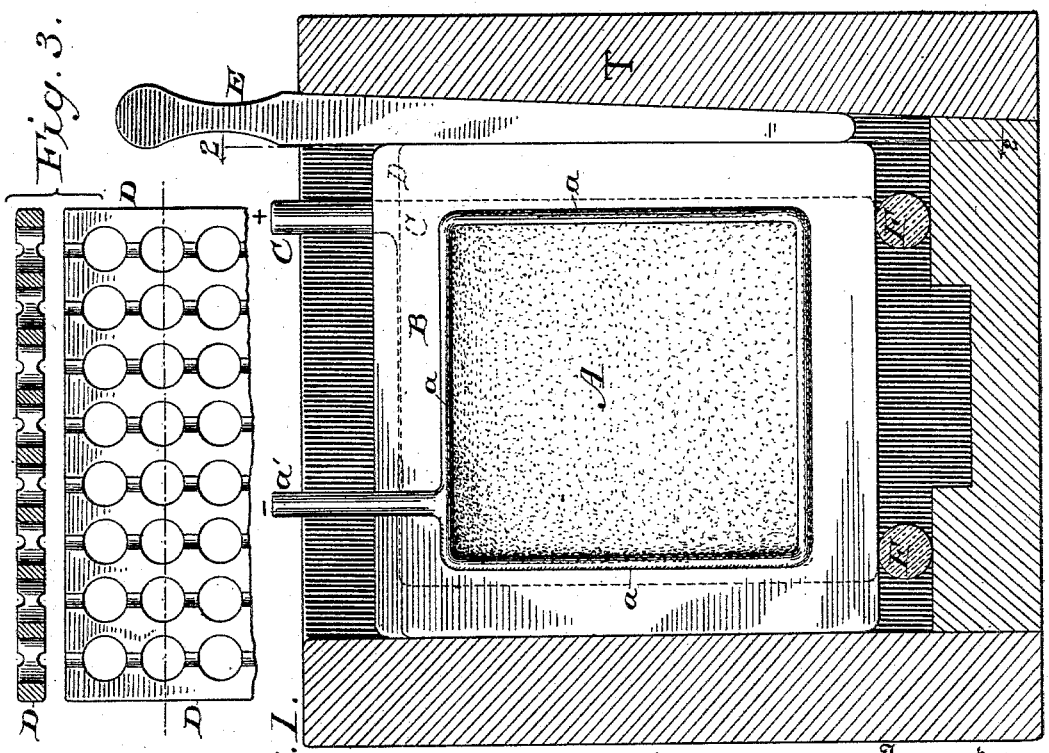

UNITED STATES PATENT OFFICE.

STANLEY C. C. CURRIE, OF PHILADELPHIA, PENNSYLVANIA, ASSIGNOR TO THE UNITED ELECTRIC IMPROVEMENT COMPANY, OF GLOUCESTER CITY, NEW JERSEY.

METHOD OF FORMING PLATES FOR SECONDARY BATTERIES.

SPECIFICATION forming part of Letters Patent No. 411,786, dated October 1, 1889.

Application filed January 30, 1889. Serial No. 298,123. (No model.)

*To all whom it may concern:*

Be it known that I, STANLEY C. C. CURRIE, electrician, a subject of the Queen of Great Britain, now residing in the city and county of Philadelphia, and State of Pennsylvania, have invented a certain new and Improved Method of Forming Plates for Electrical Accumulators, of which the following is a specification.

In the construction of such plates it has been usual to take a salt of a metal—such, for instance, as the oxides of lead, red lead, or litharge—in a pasty granular mass and press it in the form of plates or sheets into perforated or other supports. Another method sometimes practiced is to reduce by electrolysis a pasty mass of sulphate of lead into a similar form. Plates thus made require no further treatment to constitute the positive elements of an accumulator; but those which are to constitute the negative elements have to undergo a process of "formation," consisting in converting the pure lead of which they are composed into a state of peroxide. It is well known that a metal of the character mentioned, in taking up its relative chemical equivalent of oxygen, increases sensibly both in bulk and weight; consequently the negative accumulator plates, during their formation, increase in bulk, the general tendency being to expand in all directions. Such expansion depends upon the degree of porosity and the compactness of the mass from which the plate is "formed" in the first instance and the proportion thereof capable of being converted into the peroxide state. The expansion of lead—the material commonly used for accumulator plates or elements—is greatest when the mass is most porous.

The object of my invention is to produce formed negative elements for electrical accumulators having a hard, compact, uniform, homogeneous body. This end I attain by a novel method of forming the plates while prevented from expanding outward, and particularly in the direction of their planes, thus causing the expanding force to be expended within the plate itself, which expansion exerts a uniform and even pressure throughout its body, thereby increasing its density without correspondingly increasing its bulk.

In the accompanying drawings, which show a convenient apparatus for practicing my invention, Figure 1 represents a vertical longitudinal section through a cell or tank parallel with plates arranged therein, showing one of the plates to be formed; Fig. 2, a vertical transverse section therethrough on the line 2 2 of Fig. 1. Fig. 3 is a detail view of one of the grooved and perforated separating insulating-plates, showing both a face view and a section therethrough.

A cell or tank T, of suitable well-known construction, contains a proper electrolytic bath, in which the plates are immersed, their lower edges resting upon insulating-rods F, as usual. The negative elements or plates A are made with a stiff bead, flange, or rim $a$, of the same metal as the plate itself, and are inclosed within rigid frames B, of suitable construction and material—lead, for instance—closely surrounding the edges of the plates. The usual tags $a'$ project from the rim $a$ through slots or apertures in the frame. These plates and frames are then inserted in the tank in alternation with the usual positive plates or elements, or plain lead plates C, either cast or cut from ordinary sheet-lead, but separated therefrom by plates D, of suitable insulating material, preferably perforated horizontally and transversely and grooved vertically, as shown in Fig. 3, to permit of the free circulation and proper action of the electrolytic fluids and of the escape of gas. The whole assemblage of plates is firmly secured by keys or wedges E, inserted between the sides and ends of the plates and the walls of the tank, or in other equivalent well-known ways. The negative plates are formed or converted into the peroxide state by the passage of a current of electricity, as usual, and being rigidly held at their edges by their frames and wedges, and to some extent, at their sides, by the insulating-plate, the expansion accompanying such formation expends its force within the body of the plate itself, resulting in the production of strong, compact, unwarped plates of uniform consistency.

I am aware that salts of lead in the form both of oxides and sulphates have been subjected to external pressure, with or without the addition of steam, and do not therefore broadly claim subjecting accumulator-plates to pressure. My invention is, however, discriminated from former processes by the fact that I take the lead in its reduced spongy form—that is, pure spongy lead—and form it into plates while prevented from expanding outwardly, the distinguishing feature of my invention thus consisting in causing the expansive action of the material during the process of formation to condense the plate instead of subjecting it to mechanical pressure from an external source.

The apparatus herein described constitutes the subject-matter of another application, Serial No. 298,284, filed January 31, 1889, and is consequently not herein claimed.

What I claim as my invention, and desire to secure by Letters Patent, is—

1. The hereinbefore-described improvement in the method of forming elements of electrical accumulators, which consists in converting the plates into the peroxide state while confined against expansion, substantially as set forth.

2. The hereinbefore-described improvement in the method of forming elements of electrical accumulators, which consists in converting the plates into the peroxide state while they are confined at their edges against expansion, substantially as set forth.

3. The hereinbefore-described method of making plates or elements for electrical accumulators, which consists in reducing the metal to a soft spongy state and then forming it while confined against expansion, substantially as set forth.

4. The hereinbefore-described method of making plates or elements for electrical accumulators, which consists in condensing the mass constituting the body of the plate by the force exerted by the expansive action of the forming process itself, in contradistinction to external mechanical pressure.

In testimony whereof I have hereunto subscribed my name.

STANLEY C. C. CURRIE.

Witnesses:
   MORRIS R. BOCKIUS,
   I. W. HURFF.